(12) United States Patent
Scholl

(10) Patent No.: US 6,272,407 B1
(45) Date of Patent: *Aug. 7, 2001

(54) VEHICLE EQUIPPED WITH A CONTROL SYSTEM

(75) Inventor: Frank Scholl, Schwieberdingen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,831

(22) Filed: Dec. 5, 1997

Related U.S. Application Data

(63) Continuation of application No. 08/437,164, filed on May 8, 1995, now abandoned.

(30) Foreign Application Priority Data

May 6, 1994 (DE) .................................................. 44 16 008

(51) Int. Cl.[7] ........................................................ G06F 7/00
(52) U.S. Cl. .................................................. 701/29; 701/36
(58) Field of Search ................................. 701/29, 71, 70; 340/461, 525, 815.45, 660, 661, 664; 364/184, 528.36; 318/453, 139, 455; 361/30, 59; 702/58, 64, 185

(56) References Cited

U.S. PATENT DOCUMENTS

| | | | |
|---|---|---|---|
| 3,914,675 | * 10/1975 | Konrad | 318/453 |
| 3,950,656 | * 4/1976 | Sumida et al. | 327/18 |
| 4,234,847 | * 11/1980 | Schweitzer | 324/146 |
| 4,495,489 | * 1/1985 | Schweitzer, Jr. | 340/664 |
| 4,536,758 | * 8/1985 | Schweitzer, Jr. | 340/664 |
| 4,674,030 | * 6/1987 | Gabriel et al. | 364/184 |
| 4,739,326 | * 4/1988 | Anderson et al. | 340/945 |
| 4,837,552 | * 6/1989 | Vandemotter et al. | 340/461 |
| 5,120,982 | * 6/1992 | Yopp et al. | 307/10.1 |
| 5,159,319 | * 10/1992 | Dunk et al. | 340/546 |
| 5,220,311 | * 6/1993 | schweitzer, Jr. | 340/650 |
| 5,243,324 | * 9/1993 | Bober | 340/439 |
| 5,265,468 | * 11/1993 | Holst et al. | 73/118.1 |
| 5,475,371 | * 12/1995 | Dunk et al. | 340/660 |
| 5,524,078 | * 6/1996 | Kolb et al. | 701/29 |
| 5,537,283 | * 7/1996 | Keese | 361/42 |
| 5,648,759 | * 7/1997 | Miller et al. | 340/660 |
| 5,673,028 | * 9/1997 | Levy | 340/635 |

\* cited by examiner

Primary Examiner—Jacques H. Louis-Jacques
(74) Attorney, Agent, or Firm—Kenyon & Kenyon

(57) ABSTRACT

A control system for a vehicle, in particular for a truck trailer, has a control device which switches off the control system upon the occurrence of a fault. The control system of the vehicle includes a bistable mechanical display which can be controlled via a coil arrangement into, in each case, one of its stable positions and then displays either a fault condition or no fault condition. Upon switching off the control device because of a fault which has occured, the display is controlled into the "fault" position, and it remains there even without a power supply. Consequently, a faulty system can be detected at any time even without a power supply switched on.

19 Claims, 3 Drawing Sheets

VEHICLE EQUIPPED WITH A CONTROL SYSTEM

CROSS REFERENCE TO RELATED APPLICATION

This application is a continuation application of application Ser. No. 08/437,164, filed May 8, 1995, now abandoned.

FIELD OF THE INVENTION

The present invention relates to a vehicle equipped with a control system.

BACKGROUND INFORMATION

German Patent Application No. DE 26 04 148 describes a monitoring device for an antilock braking control system (ABS) in which the ABS is switched off upon occurrence of a fault. Furthermore, the ABS has a fault memory having a plurality of memory locations in which the occurring faults are stored. The type of fault can be detected immediately upon diagnosis.

SUMMARY OF THE INVENTION

As a result of the present invention, it is possible even when the control system is not switched on (for example, ABS—no power supply applied) to detect whether the control system has a fault and therefore ought to be diagnosed. This is of particular interest in the case of commercial vehicle trailers in which an ABS is present but which are without a dedicated power supply. For example, a plurality of trailers are frequently standing around without an attached tractor (thus without a power supply) on a parking site. It is desirable to detect, at once upon inspection, which trailers exhibit a fault that must be rectified. If a fault memory is present, according to the present invention it is indicated that this trailer is to be diagnosed.

DETAILED DESCRIPTION OF THE INVENTION

Figure 1:
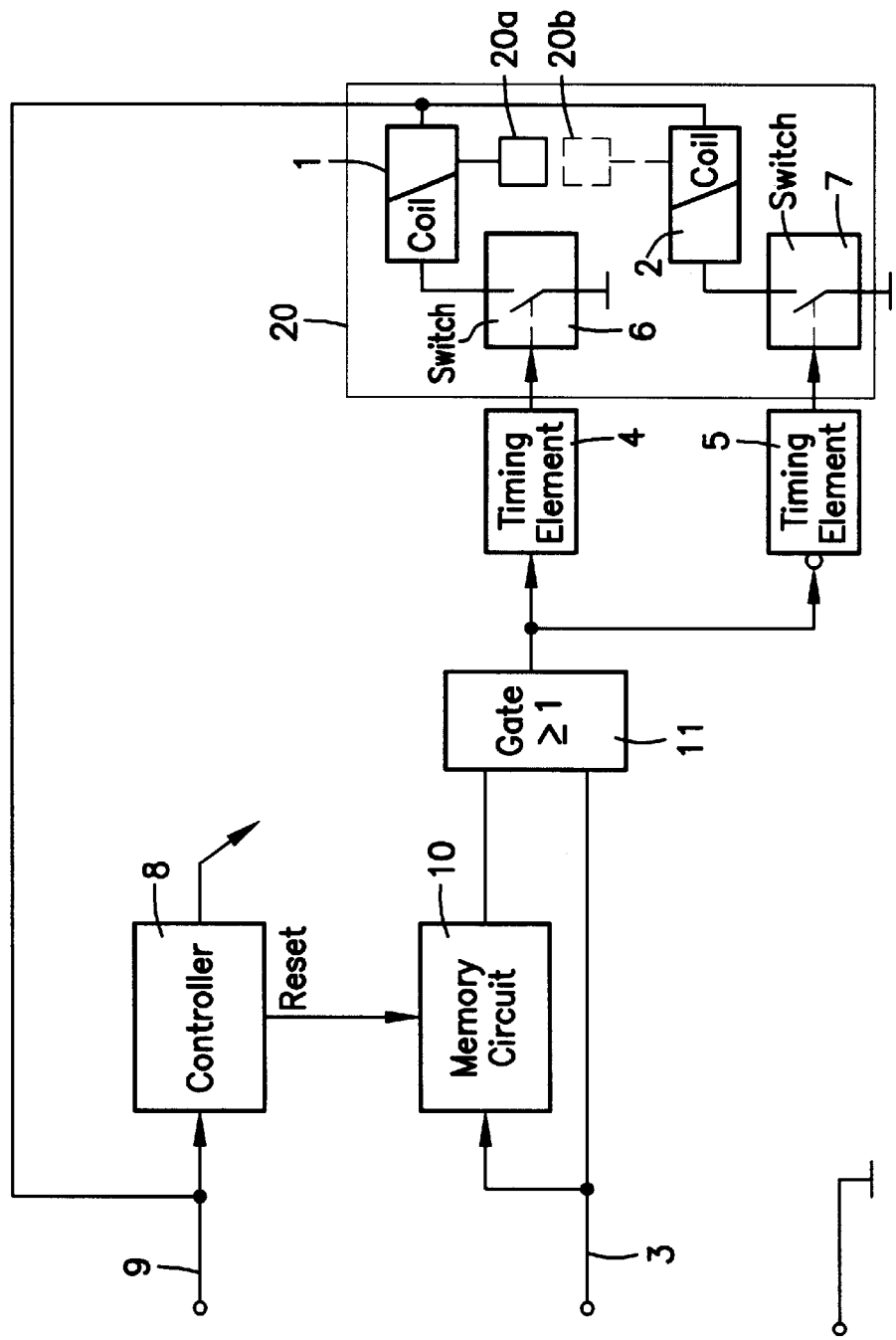
FIG. 1 shows a first exemplary embodiment of the system according to the present invention.
Figure 2A:
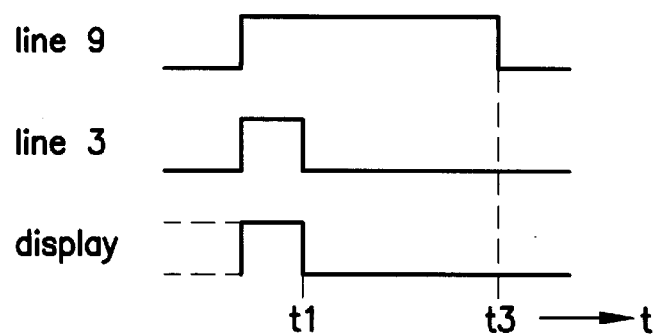
FIG. 2A shows a first timing diagram according to the system according to the present invention.

The voltage level of line 9, indicated in FIG. 1, is shown on the uppermost line in FIG. 2A, starting with the switching on of the system and ending with its being switched off. The voltage level of line 3, indicated in FIG. 1, is shown in the center line of FIG. 2A. When the control device (safety device) is switched on, the latter always outputs a voltage level which indicates an apparent fault. As an example, the valve relay in the control device has dropped out in this period. As a result, switch 7 is triggered via or gate 11 (output signal of gate 11=O, inversion at the input of the timing element 5) and the display is brought into the position for a "bad" display. If there is no actual fault at the instant $t_1$, the level on line 3 changes and the switch 6 is actuated through timing element 4 and the display is brought into the position for a "good" statement. This case is assumed in FIG. 2a. The "good" display is maintained even after the control device (at time $t_3$) has been switched off.

Figure 2B:
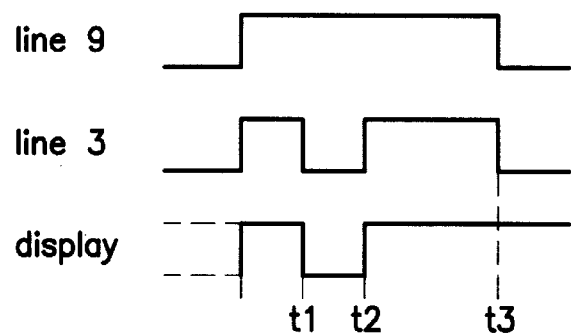
FIG. 2B shows a second timing diagram according to the present invention.

In the case of the exemplary embodiment whose timing diagram is shown in FIG. 2B, it is assumed that at the start, the cycle runs as in FIG. 2a, but that a fault occurs at $t_2$. The voltage level on line 3 therefore changes to, for example 10 V, and the display is brought into the position for a "bad" statement. This position is maintained even after the control device has been switched off. The memory circuit 10 has the purpose, in conjunction with the gate 11, of storing the level on the line 3 up to the instant of switching on, and thus of detecting a sticking valve relay or a cable break (FIG. 2C).

Figure 2C:
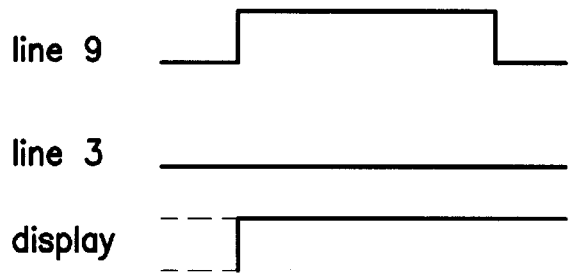
FIG. 2C shows a third timing diagram according to the present invention.

FIG. 2C treats the case of the sticking valve relay contact. Here, the level remains at 0 V on line 3, and the "bad" position display is maintained, since the memory circuit 10 does not have a high level at the point of switching on, and as a consequence a sticking valve relay or a cable break of line 3 is present.

In the exemplary embodiment discussed, the display always first goes into the position for a "bad" statement upon being switched on. It must be brought into the position for a "good" statement actively by means of a faultless system. If no control device is connected (cable break), the display remains in the fault state.

Since, for example, in the case of ABS control devices, the level characteristic of line 3 is present on the switch-off path/valve relay contact of the control device, the display possibility of FIG. 1 can even be retrofitted in the case of existing control devices without intervening in the control device. The memory circuit 10 through controller 8 is cleared (reset) when the power supply is switched off.

Figure 3:
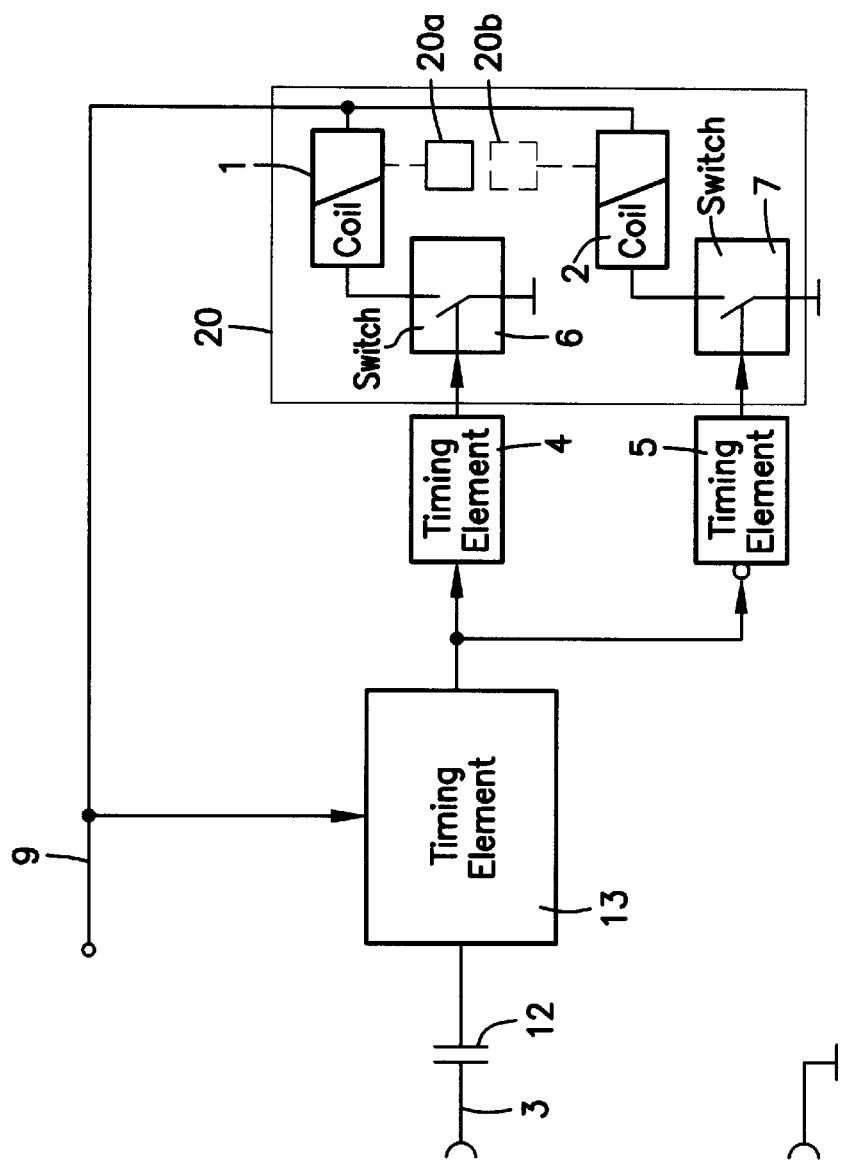
FIG. 3 shows another exemplary embodiment of the system according to the present invention.

The exemplary embodiment according to FIG. 3 differs from the exemplary embodiment of FIG. 1 in that in the case of a faultless control device which has been switched on, the latter continuously outputs pulses on line 3. Via a capacitor 12, the latter reach a timing element 13 which triggers the coil 1 upon arrival of the pulses. If the pulses are absent upon occurrence of a fault, and if the control device outputs a static level, the coil 2 is triggered and thus a "bad" statement is made. In FIG. 1 and in FIG. 3, the coil arrangement of coil 1 and coil 2 controls an element (not shown) to one of the stable positions 20a and 20b of bistable display 20 for displaying either a fault condition or a no fault condition. In this way, the fault condition is displayed for one of the two stable positions 20a and 20b of the bistable display 20 and the no fault condition is displayed for the other one of the two stable positions 20a and 20b of the bistable display 20. It is possible here, as well, to generate a characteristic corresponding to FIG. 2a after switching on the ignition, there being a need for appropriate control of the pulses. This solution requires intervention in the control device, since the pulses must be generated there. It has, however, the advantage that the status of the internal fault memory is displayed and not only whether the last operating state was in order.

The display can also be provided with only one coil, which must then be fed with voltages of different polarity for the purpose of being set in the different positions.

What is claimed is:

1. A control system for a vehicle, comprising:
   a control device that switches off the control system upon detection of a fault condition in the control system;
   a mechanical display including an element which is capable of being set into a first stable position and a second stable position, the first position visibly indicating the fault condition when the fault condition is present, the second position visibly indicating a non-fault condition when the non-fault condition is present, the position of the element being reversible via a coil arrangement; and an evaluation circuit coupled to the control device, the evaluation circuit detecting the switch-off of the control system and setting the element to be in the first position indicating the fault condition in response to the switch-off detection, wherein the element is maintained in the first position after the switch-off of the control system.

2. The control system according to claim 1, wherein the control system further comprises at least one actuator and the control device switches over a relay to switch off the at least one actuator of the control system, and wherein the evaluation circuit detects the switch off of the at least one actuator.

3. The control system according to claim 1, wherein the control device includes a fault memory for storing faults occurring in the control system such that the fault memory can be read via a diagnostic terminal and the stored faults can be located.

4. The control system according to claim 3, wherein the evaluation circuit is coupled to the control device via a diagnostic line.

5. The control system according to claim 1, wherein the evaluation circuit receives a changed signal upon the detection of the fault.

6. The control system according to claim 5, wherein the changed signal is a level change in a DC voltage signal.

7. The control system according to claim 5, wherein the changed signal includes one of a first transition of a DC voltage signal to a pulsed signal and a second transition of the pulsed signal to the DC voltage signal.

8. The control system according to claim 1, wherein the coil arrangement includes a first coil and a second coil, the first coil setting the element into the first position and the second coil setting the element into the second position, a reversal of the position of the element being achieved by triggering one of the first coil and the second coil.

9. The control system according to claim 1, wherein the coil arrangement includes a single coil, the single coil receiving a voltage having one of a first polarity and a second polarity, the first polarity setting the element into the first position and the second polarity setting the element into the second position, a reversal of the position of the element being achieved by triggering the single coil with the voltage having one of the first polarity and the second polarity.

10. The control system according to claim 1, wherein when the control system is initially switched on, the element is in the first position indicating the fault condition, the element subsequently being set to the second position indicating the non-fault condition when the control system is intact.

11. The control system according to claim 1, wherein the control system includes an ABS.

12. The control system according to claim 1, wherein the vehicle includes a motor vehicle trailer.

13. The control system according to claim 1, wherein the element is in the first position when the fault condition is present and no power is received by the control device, the mechanical dispaly or the evaluation circuit.

14. The control system according to claim 1, wherein the evaluation circuit activates the element to be in the second position when the non-fault condition is present.

15. The control system according to claim 1, wherein the fault condition is indicative of a fault of a device provided for an anti-lock braking system of the vehicle.

16. A control system for a vehicle, comprising:

a control device that switches off the control system upon detection of a fault condition in the control system;

a mechanical display displaying one of a first stable state indicating the fault condition and a second stable state indicating a non-fault condition, the state of the mechanical display being reversible via a coil arrangement; and an evaluation circuit coupled to the control device, the evaluation circuit detecting the switch-off of the control system and controlling the mechanical display to display the first stabe state indicating the fault condition in response to the switch-off detection, wherein the mechanical display displays the first stable state when the fault condition is present and no power is received by the control system.

17. The control system according to claim 16, wherein the mechanical display includes an element moving between a first stabe position and a second stable position, the first position being visible to an occupant of the vehicle to indicate the fault condition, the second position being visible to the occupant of the vehicle to indicate the non-fault condition.

18. The control sustem according to claim 16, wherein the evaluation circuit controls the mechanical display to the second stable state when the non-fault condition is present.

19. The control system according to claim 16, wherein the fault condition is indicative of a fault of a device provided for an anti-lock braking system of the vehicle.

* * * * *